United States Patent [19]

Gianfranco

[11] Patent Number: 4,928,434
[45] Date of Patent: May 29, 1990

[54] LAPPING INTERNAL SURFACES

[75] Inventor: Cassanelli Gianfranco, Bologna, Italy

[73] Assignee: Trimate, Bologna, Italy

[21] Appl. No.: 254,699

[22] Filed: Oct. 7, 1988

[30] Foreign Application Priority Data

Oct. 30, 1987 [IT] Italy .................................. 3676 A/87

[51] Int. Cl.$^5$ .............................................. B24B 33/00
[52] U.S. Cl. ...................................... 51/3.4 H; 51/93;
51/290; 51/DIG. 6
[58] Field of Search .............. 269/16; 51/341 H, 34 J,
51/44, 45, 46, 290, 93, DIG. 6

[56] References Cited

U.S. PATENT DOCUMENTS

| | | | |
|---|---|---|---|
| 3,352,067 | 11/1967 | Estabrook | 51/34 H |
| 4,223,485 | 9/1980 | Largeteau | 51/DIG. 6 |
| 4,615,152 | 10/1986 | Bogaert | 51/353 |

FOREIGN PATENT DOCUMENTS

| | | | |
|---|---|---|---|
| 34749 | 3/1983 | Japan | 51/34 H |
| 1060423 | 12/1983 | U.S.S.R. | 51/34 H |
| 434500 | 9/1935 | United Kingdom | 51/34 H |
| 705452 | 3/1954 | United Kingdom | 51/34 H |

*Primary Examiner*—Frederick R. Schmidt
*Assistant Examiner*—Blynn Shideler
*Attorney, Agent, or Firm*—Charles Fallow; Martin Hoffman

[57] ABSTRACT

In improved equipment for lapping internal surfaces, use is made of a composite lap, the rod of which is held by the tool spindle and inserted with a marginal degree of clearance into a cone that carries the abrasive shell, and a chucking mechanism located beneath and coaxial with the spindle and lap; errors are avoided, particularly with smallbore work, by embodying the lap rod in three rigidly associated sections, namely, a polygonal tip, insertable and fastened with a transverse pin in a matching polygonal socket offered by the cone, a flexible coupling section, and a shank uppermost that is screwed into or otherwise clamped to the spindle. Work to be lapped is held in a chuck suspended from at least three cables threaded through relative peripheral mountings afforded by the chuck itself.

11 Claims, 2 Drawing Sheets

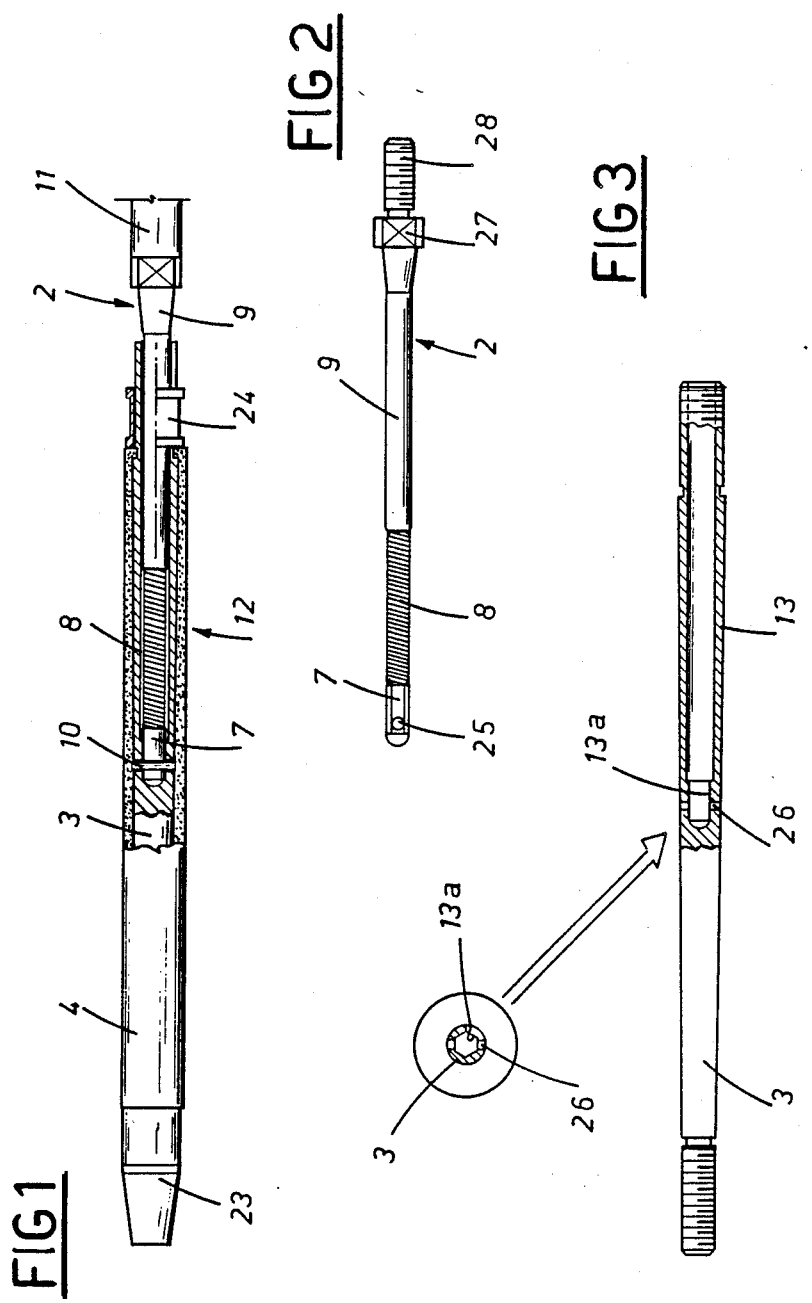

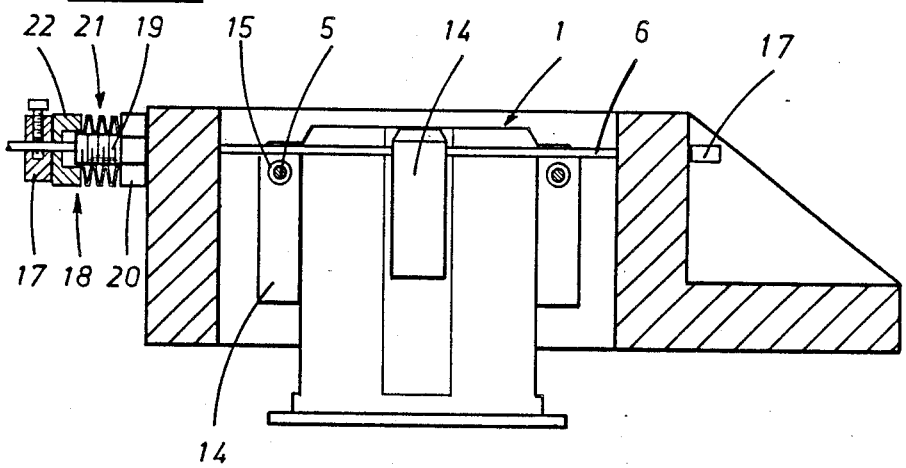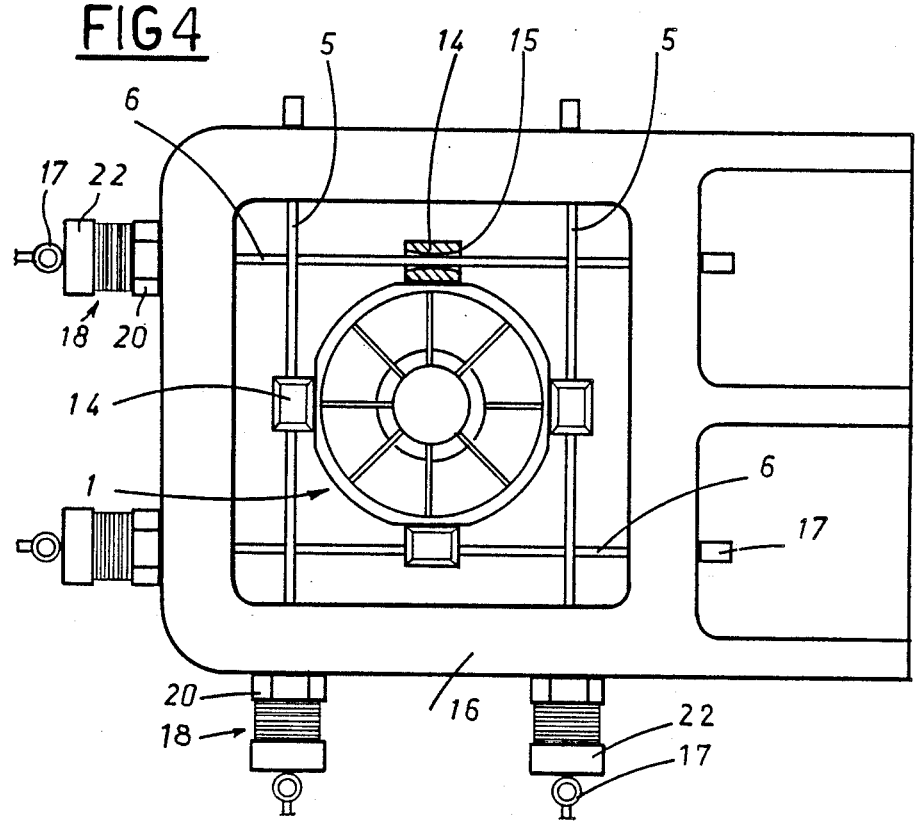

4,928,434

LAPPING INTERNAL SURFACES

BACKGROUND OF THE INVENTION

The invention relates to improved equipment for lapping internal surfaces.

Conventionally, use is made of lapping machines, or lapping equipment, to effect polishing and truing operations that call for a high quality precision finish, for example, such as presented by the bores of parts manufactured to prescribed fit tolerances; a typical case in point is that of the barrels of hydraulic and pneumatic cylinders.

The operation effected with lapping equipment is a finishing process; work to be lapped may be either heat-treated or untreated, heat treatment being adopted where the work is to be guaranteed a given degree of surface hardness. An initial machining or grinding pass may be made, whereupon the lapping operation will constitute the final step.

Considerable accuracy is obtainable with lapping machines, down even to fractions of a micron, and it is therefore essential to avoid any contingency that may lead to dimensional inaccuracies, such as errors in shape.

One such contingency, when operating with a machine designed for lapping internal surfaces, is created at the moment when the lap is introduced into the bore to be finished.

The main difference between this type of machine and machines for external lapping, which can also finish plane surfaces, is that it is structured principally for finishing cylindrical surfaces of circular cross section, and will normally operate in the vertical axis with the lap entering the work from above.

In order to avoid the occurrence of errors, that is, unintentional widening of the bore occasioned on introduction of the lap, as mentioned above, the work is chucked in a floating fixture, and the lap held in such a way as to allow a barely perceptible transverse oscillation.

This carefully calculated freedom of movement is invisible to the naked eye (though verifiable by measuring the work, given the tolerances that are generally prescribed), but sufficient to enable the bore and the lap to adapt gently to one another as the lap enters the work and the pass commences. Notwithstanding the close tolerances characteristic of lapping machine construction, it will rarely occur that one has the necessary faultless coaxial alignment when the lap is inserted into the bore of the work; moreover, the lack of any self-alignment facility results in a conical or 'banana' defect that becomes the more pronounced as the departure from coaxial alignment becomes greater.

Given that internal lapping generates a profile referred to the lapped bore itself, rather than to any external datum (e.g. perpendicular or concentric alignment with other surfaces etc.), care must be taken to achieve coaxial alignment between the lap and the bore of the work without in any way forcing either component.

Currently, self-alignment is achieved by supporting the floating chuck with a system of slides set at right angles to one another, in such a way that the work can move freely in the appropriate direction, and using a lapping tool of composite type design. In one such composite embodiment, the lap comprises: a support rod, the top end of which is associated with a floating spindle; a cone, ensheathing the rod and allowed a certain freedom of transverse movement relative thereto; and an abrasive diamond shell that is fitted rigidly over the cone.

The freedom of the cone to shift in relation to the rod is obtained in this instance by leaving a small clearance between the two parts and supporting the cone on two moderately loose pins; these are fitted one at either side, at dissimilar distances from the end of the rod, and thus interconnect the two parts. Accordingly, the cone and the rod are prevented from separating, and a marginal float is permitted, the extent of which being dependent upon the clearance allowed.

The lap and the chucking fixture thus described are suitable for bores of a given diameter, but tend to create problems when lapping notably small bores. More exactly, with a small diameter lapping tool of the composite type in question, the walls of the cone and the diamond shell are necessarily thin, so that if an obstacle should be encountered, or should the tool's speed of rotation drop for any reason, the rod immediately becomes subject to increased torque. This higher torque is transmitted through the rod to the cone and shell by way of the two pins, with stresses concentrated particularly on the opposite ends of the pins. However, the cone and the abrasive shell will often not be thick enough to sustain the thrust with which they are invested by the ends of the pins, and are forced outwards and distorted as a result.

In such a situation, bulges are produced in the outer surface of the diamond shell which, though not large, are sufficient to enlarge the cross section of the abrasive surface and its action at a given point, with the result that the lapped surface will be inaccurate; it can also happen that the lap will bind against the bore of the work and break.

When lapping a small-bore work, and/or where especially great precision is required, problems can also arise with movement of the chucking fixture; more exactly, the chuck unit is not replaced with a lighter one to suit the smaller work, and it happens that the weight of the smaller lap required for the small bore is often insufficient to shift the chuck and the work, in order to bring them into coaxial alignment.

Moreover, it is not always effectively possible to replace the chuck with another of different size to suit heavier or lighter work. Accordingly, the object of the invention is one of overcoming the drawbacks mentioned above, both from the standpoint of the lapping tool and from that of the work chucking fixture.

The stated object is achieved with lapping equipment as disclosed and claimed herein.

SUMMARY OF THE INVENTION

Improved equipment according to the invention is of the type utilizing a chuck to hold the work, and a composite lapping tool that consists in a vertical rod ensheathed by a marginally loose fitting cone supporting a diamond shell.

The composite lap disclosed features a rod embodied in three rigidly associated sections: a bottom section of polygonal transverse profile engaging to an exact fit in a corresponding axial socket offered by the cone and locked in position axially be means of a diametral pin; a middle section, possessing a degree of flexibility commensurate with the tolerances prescribed for the work, whilst ensuring sufficient torsional rigidity to function as a flexible coupling; and a top section connected to the spindle.

The improved work chucking fixture according to the invention is suspended from at least three cables which pass through respective peripheral mountings integral with the chuck; thus, chuck and work can shift bodily in any given plane, and are provided with a cushioning system at one and the same time.

One of the advantages of the invention is that of its adaptability to different sizes of bore to be lapped, and to varying sizes of workpiece, inasmuch as torque is transmitted from the rod to the cone through polygonal mating surfaces; accordingly, the area through which these two parts make contact is generous, and distributed uniformly about the axis of the abrasive shell, however small the overall diameter. Also, the mobility of the chuck can be adjusted by tautening or slackening the cables to suit the weight of the work, and offset mechanical resistance, if any, generated by the lapping action. Moreover, the three-stage embodiment of the lap rod is instrumental in obtaining a more accurate seating of the lap internally of the bore to be finished, thanks to the combined elasticity and resilience of the middle section and its ability to function as a flexible coupling.

Another advantage of the invention is that it is simple in construction, and therefore advantageous from the cost standpoint; in effect, the only parts requiring any significant degree of precision are the polygonal bottom section of the lap rod and the matching socket of the cone.

Yet another advantage of the invention is that the stresses transmitted through the lap rod to the cone and shell can be reduced practically at will, since mating contact occurs across the full expanse of the polygonal profile offered by the bottom section of the rod, and accordingly, this same polygonal profile can be lengthened or shortened axially so as to reduce or increase mechanical pressure on the cone during the lapping process.

BRIEF DESCRIPTION of the DRAWINGS

The invention will now be described in detail, by way of example, with the aid of the accompanying drawings, in which:

FIG. 1 is an axial section through a lapping tool forming part of improved equipment according to the invention;

FIGS. 2 and 3 are views of the lap shown in FIG. 1, in side elevation, and half-elevation/half-section, respectively, which illustrate two of its component parts, namely the rod and the cone;

FIGS. 4 and 5 illustrate the work chucking fixture forming part of improved equipment according to the invention, in plan and axial section, respectively.

DESCRIPTION OF THE PREFERRED EMBODIMENTS

The improved equipment disclosed, which is used for lapping internal surfaces, consists essentially in a vertically disposed composite lapping tool 12, fastened directly or indirectly in conventional fashion to an overhead spindle 11, and a chucking fixture 1 (FIGS. 4 and 5) mounted to the bed of the lapping machine (not illustrated).

The composite lap 12, as illustrated in FIG. 1, comprises a rod 2, located uppermost and connected by its top end to the spindle 11, a cone 3, located below and carried by the rod 2, and an abrasive diamond shell 4 that ensheaths the cone 3 to an exact fit.

The cone 3 has an axial hole 13 with an open top end in which the bottom end of the rod 2 is freely inserted, the degree of clearance allowed being compatible with the tolerances prescribed for the lapping operation.

The diamond shell 4, which provides the abrasive part proper to the composite lap 12, is fitted to and removable from the cone 3 by conventional means such as lock nuts 23 and 24, for example, that screw onto corresponding threads offered by the ends of the cone 3 and clamp the shell 4 from either end, as illustrated in FIG. 1.

According to the invention, the lap rod 2 comprises three sections, 7, 8 and 9, which are associated rigidly and coaxially one with the next. The bottom section or tip, denoted 7, exhibits a polygonal, preferably hexagonal transverse profile (discernable in FIG. 2), and has a diametrically disposed hole 25 serving to accommodate a pin. The polygonal tip 7 is insertable to an exact fit in a matching polygonal socket 13a afforded by the axial hole 13 of the cone 3, which also presents a diametrically disposed hole 26 positioned to coincide coaxially with the hole 25 of the tip 7.

Numeral 10 denotes the aforementioned pin, which inserts to an exact fit in the holes 25 and 26 offered by the hex tip 7 and socket 13a, thereby furnishing the means by which the rod and cone parts 2 and 3 of the composite tool 12 are connected, and constituting the sole means by which the cone 3 is supported.

The length of the hex tip 7 will depend first and foremost on the outer diameter of the abrasive shell 4: the smaller the diameter of the shell 4, the greater the length of the hex tip 7. Given, in fact, that torque generated by the spindle motor is transmitted from the rod 2 to the cone 3 by way of the hex tip 7, the pressure with which the cone 3 is invested by the tip 7 will be proportionally less (transverse dimensions remaining equal) the greater the lateral surface area of the tip 7 that enters into contact with the cone 3, i.e. the longer the axial dimensions of the tip 7.

More exactly, the hex tip 7 coincides with the center of balance of the composite tool, so as to avoid overloading the bottom end and ensure better balance overall.

The middle section of the rod 2, denoted 8 and referred to hereinafter as a coupling (the reasons for which will shortly become clear), is formed of material possessing a given degree of flexibility that will be commensurate with tolerances prescribed for the lapped work, though sufficient at all events to ensure good torsional rigidity.

In the embodiment illustrated, the coupling 8 consists in a longitudinal element embodied as a tightly coiled helicoid, i.e. with no gaps between the turns of the helix, generated in the opposite direction to that in which the lap 12 turns with the spindle 11; the coupling 8 is accommodated freely by the axial hole 13 of the cone 3, the actual degree of clearance being compatible with the prescribed lapping tolerances.

The top section, or shank 9, exhibits a stretch of diameter substantially identical to that of the coupling 8, an intermediate boss 27 of wider transverse dimensions, and a screw thread 28 at the very top end. The boss 27 affords two flat parallel faces that can be engaged by a key or wrench to the end of tightening the screw thread 28 in the female thread of a holder, either integral with or attached to the spindle 11.

The method of assembling an improved lapping tool 12 according to the invention is substantially the same as for a conventional composite tool, and therefore will not be described.

As regards operation of he composite lap 12, it will be seen that the abrasive shell 4 is capable of movement in relation to the rod 2 by virtue both of the clearance existing between rod and cone 3, and of the elastic properties of the coupling 8, which are such as to make the rod advantageously flexible while ensuring that it retains a sufficient degree of torsional rigidity.

The inclusion of the coupling 8 provides another marked advantage, namely, the capacity to function as a safety device in the event of some unforeseen obstacle slowing down or jamming the shell 4. More exactly, the coupling 8 can be proportioned in the manner of a shear pin, i.e. capable of transmitting torque only up to a given maximum value, in excess of which it will break, preventing damage either to the work or to other components of the equipment.

Turning now to the chucking fixture 1 which, for example, might be a conventional type self-aligning chucking mechanism, this is suspended from at least three longitudinal elements, embodied as cables 5 and 6, anchored to fixed supports provided by the side walls of a vertically disposed hollow frame 16 (see FIG. 4) that is made fast to the machine bed in conventional manner. In the embodiment illustrated, the cables 5 and 6 are arranged in two pairs, set at different heights in order to avoid mutual contact; it will be seen, in fact, that the two cables of each pair are parallel and disposed at right angles to those of the remaining pair.

The cables 5 and 6 associate with the chuck 1 by way of four peripheral hollow mountings 14 fitted in pairs and occupying positions that are diametrically opposed in relation to the vertical axis of the chuck 1.

It will be observed from FIG. 4 that the diameter of the passage 15 through each mounting 14 decreases from the ends toward the middle, creating what is a substantially biconical, hourglass type profile the waisted portion of which is rounded so as to avoid any excessive build-up of tension at that point. The minimum diameter of the passage 15 substantially matches the diameter of the respective cable 5 or 6, in such a way as to prevent any unwanted sideways movement of the chuck 1 in relation to the cables 5 and 6.

The two ends of each cable 5 and 6 pass through the side walls of the frame 16, and are prevented from working free by relative fixed and removable locking elements 17 located externally of the frame. In the embodiment illustrated in FIGS. 4 and 5, each cable 5 and 6 is secured by one fixed element 17, and one removable element, or clamp.

Numeral 18 denotes a device encircling each cable 5 and 6 at one end, located between the relative clamp 17 and the frame 16, which serves to adjust the tension of the cable with which it is associated. Each such device 18 consists in an externally threaded hollow member 19 associated rigidly with the cable 5 or 6, an adjuster nut 20 screwed onto the threaded member 19, and a set of belleville disc springs 21 through which the threaded member 19 is inserted. Where the device is assembled such that the springs 21 impinge on the clamp 17, a distance collar 22 may also be added, as illustrated in FIGS. 4 and 5.

By moving the nut 20 one way or the other along the threaded member 19, the relative cable 5 or 6 can be tensioned or slackened to suit the size of the work, and more important, to suit its weight. The cables 5 and 6 will need to be well tightened for large and bulky items, so as to avoid too loose a suspension, whereas a slacker setting is needed for lighter work in order to permit a reasonable freedom of movement as the lap 12 enters the bore. At all times, the cables 5 and 6 are always sure of a certain degree of elasticity thanks to the action of the springs 21, which will rarely be compressed to the limit.

It will be clear then, from FIGS. 4 and 5, that the chuck 1 is capable of movement in practically any direction; the arrangement of the cables 5 and 6 permits a marginal degree of rotation not only about the vertical axis, but about any given horizontal or inclined axis too.

The embodiment described and illustrated is by no means limitative; for example, the middle section 8 of the lap rod 2 might be fashioned solidly in a material with the appropriate flexible and torsional properties, or a small universal joint could even be incorporated.

What is claimed:

1. Improved equipment for lapping internal surfaces, comprising
    a composite lapping tool comprising a vertical rod uppermost, carried by a spindle, a cone at bottom which ensheaths the rod in a loose fit so as to allow a marginal freedom of transverse movement between the rod and the cone, and an abrasive diamond shell ensheathing and rigidly associated with the cone; and
    a work chucking mechanism, positioned beneath the spindle and capable of oscillating about an axis disposed substantially coaxial with, or parallel to, that of the tool, wherein the vertical rod comprises three rigidly connected sections: a bottom section of polygonal transverse profile engaging to an exact fit in a corresponding axial socket afforded by the cone and accommodating a diametral pin, a middle section, possessing a moderate degree of elasticity commensurate with the tolerances prescribed for the lapping operation and ensuring sufficient torsional rigidity to function as a flexible coupling, and a top section connected to the spindle.
    wherein the chucking mechanism is suspended from at least three cables passing through respective peripheral hollow mountings on the chucking mechanism itself.

2. Equipment as in claim 1, wherein the middle section of the rod consists in a longitudinal helicoid element, the helical generation of which occurs about the axis of the rod in the opposite direction to that of the rotation of the tool.

3. Equipment as in claim 1 or 2, wherein the dimensions of the middle section of the lap rod are calculated to produce mechanical failure on reaching a given maximum torque transmissible from the rod to the cone, so as to forestall damage attributable to obstruction encountered during lapping operations, or at all events, to a drop in the speed of rotation of the abrasive shell.

4. Improved equipment for lapping internal surfaces comprising:
    a composite lapping tool that consists in a vertical rod uppermost, carried by a spindle, a cone at bottom which ensheaths the rod in a loose fit so as to allow a marginal freedom of transverse movement between rod and cone, and an abrasive diamond shell ensheathing and rigidly associated with the cone;

a work chucking mechanism, positioned beneath the spindle and capable of oscillating about an axis disposed substantially coaxial with, or at least parallel to, that of the tool, wherein the chucking mechanism is suspended from at least three longitudinal elements, embodied as cables and made to pass through respective peripheral hollow mountings afforded by the chucking mechanism itself.

5. Equipment as in claim 4, wherein the work chucking mechanism is freely suspended from two pairs of parallel cables disposed at right angles one to the other.

6. Equipment as in claim 4, wherein the diameter of the passage through each peripheral hollow mounting decreases from the ends toward the middle.

7. Equipment as in claim 4 or 5, wherein the tension of the cables is adjustable by flexible means, commensurately with and inversely proportionate to the dimensions and weight of the work to be lapped.

8. Equipment as in claim 4 or 5, wherein the two ends of each cable are inserted through respective permanent supports and prevented from working loose by fixed or removable locking elements applied externally of the supports, and, wherein at least one end of each cable associates with a flexible tension-adjustment device located between the locking element and the permanent support.

9. Equipment as in claim 8, wherein the supports are afforded by the side walls of a vertically disposed hollow frame.

10. Equipment as in claim 8, wherein the single flexible tension-adjustment device consists in an externally threaded hollow member ensheathing and rigidly associated with the cable, an adjuster nut screwed onto the threaded member, and a spring through which at least the threaded member is inserted, in such a way that the nut can be screwed back or forward along the threaded member so as to increase or slacken the tension of the relative cable.

11. Equipment as in claim 4, wherein the two pairs of cables are located at dissimilar height one from the other.

* * * * *

UNITED STATES PATENT AND TRADEMARK OFFICE
CERTIFICATE OF CORRECTION

PATENT NO. : 4,928,434

DATED : May 29, 1990

INVENTOR(S) : Gianfranco CASSANELLI

It is certified that error appears in the above-identified patent and that said Letters Patent is hereby corrected as shown below:

On the title page, under item [19], "Gianfranco" should be --Cassanelli--;

in item [75], change "Cassanelli Gianfranco" to --Gianfranco Cassanelli--;

in item [73], change "Trimate" to --Trimate s.a.s. di Cassanelli Gianfranco & C.--.

Signed and Sealed this

Twelfth Day of November, 1991

Attest:

HARRY F. MANBECK, JR.

*Attesting Officer*  *Commissioner of Patents and Trademarks*